US008848552B2

(12) United States Patent
Puthenpura et al.

(10) Patent No.: US 8,848,552 B2
(45) Date of Patent: Sep. 30, 2014

(54) METHOD AND APPARATUS FOR FORECASTING BUSY HOUR TRAFFIC FOR A WIRELESS NETWORK

(75) Inventors: Sarat Puthenpura, Berkeley Heights, NJ (US); David G. Belanger, Hillsborough, NJ (US); Gopalakrishnan Meempat, East Brunswick, NJ (US); Sam Houston Parker, Cranbury, NJ (US); Ravi Raina, North Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 287 days.

(21) Appl. No.: 12/952,950

(22) Filed: Nov. 23, 2010

(65) Prior Publication Data

US 2012/0127871 A1    May 24, 2012

(51) Int. Cl.
*G06Q 10/00* (2012.01)
*G06Q 30/02* (2012.01)
*H04L 12/24* (2006.01)

(52) U.S. Cl.
CPC .......... *H04L 41/147* (2013.01); *G06Q 30/0202* (2013.01)
USPC ........................................ 370/252; 705/7.31

(58) Field of Classification Search
CPC ..... H04L 41/14; H04L 41/142; H04L 41/147; H04L 43/062
USPC .............. 370/229, 230, 230.1, 252, 247, 335, 370/341; 705/7.29–7.37
See application file for complete search history.

(56) References Cited

U.S. PATENT DOCUMENTS

| | | | | |
|---|---|---|---|---|
| 5,448,621 | A  * | 9/1995 | Knudsen | 455/427 |
| 5,594,940 | A  * | 1/1997 | Peterson et al. | 455/429 |
| 6,223,041 | B1 * | 4/2001 | Egner et al. | 455/452.2 |
| 6,636,486 | B1 * | 10/2003 | Magloughlin | 370/252 |
| 7,142,868 | B1 * | 11/2006 | Broyles et al. | 455/453 |
| 7,912,087 | B2 * | 3/2011 | Tsukishima et al. | 370/468 |
| 7,970,934 | B1 * | 6/2011 | Patel | 709/244 |
| 2004/0214583 | A1* | 10/2004 | Graham et al. | 455/453 |
| 2005/0033859 | A1* | 2/2005 | Karsten | 709/233 |
| 2007/0041401 | A1* | 2/2007 | Kaneda et al. | 370/468 |
| 2009/0319310 | A1* | 12/2009 | Little | 705/7 |

* cited by examiner

*Primary Examiner* — Gary Mui
*Assistant Examiner* — Kabir Jahangir

(57) ABSTRACT

A method and apparatus for forecasting busy hour traffic for a network are disclosed. For example, the method obtains actual traffic data for a seed time frame for each of one or more sectors in a given market and marketing projections for one or more forecast time frames for the given market, and determines a market traffic actual measure for the given market from the actual traffic data. The method obtains market traffic estimates from one or more previous runs, and updates the one or more market traffic estimates for the one or more forecast time frames beyond the seed time frame to obtain one or more updated market traffic estimates, wherein the updated market traffic estimates are used for forecasting the busy hour traffic data for each of the one or more forecast time frames beyond the seed time frame.

8 Claims, 5 Drawing Sheets

METHOD AND APPARATUS FOR FORECASTING BUSY HOUR TRAFFIC FOR A WIRELESS NETWORK

The present disclosure relates generally to communication networks and, more particularly, to a method and apparatus for forecasting busy hour traffic for a network, e.g., a wireless network.

BACKGROUND

As Internet usage continues to grow, more and more customers are accessing communications services via a mobile device, e.g., a cell phone, a laptop computer, a smart phone, a Personal Digital Assistant (PDA), etc. For example, a customer may receive multimedia content via his/her cell phone. The cell phone transmits and receives voice and data packets to and from the service provider's network via a base station and an access network.

The customer's ability to access services via a wireless device is dependent on the availability of capacity on various network elements, e.g., radio access networks, cell site equipment and so on. The service provider may forecast the demand for a radio access network and/or cell site equipment such as a base station and deploy the necessary equipment in the network accordingly. However, the wireless network business is dynamic in nature. That is, as customers increase their mobility and change the type of services that they access, the demand prediction becomes increasingly unreliable. In one example, a large number of customers may subscribe to receive a streaming media (e.g., for a playoff football game) via their respective cell phones, such that the base stations and/or access network may not have sufficient capacity set aside for streaming the requested media content. The customers may become dissatisfied with the service, and the service provider may experience reduced revenue and/or increased churn. In another example, a new application of interest, e.g., an online gaming application, educational application, etc., may be released. Hence, the demand may dynamically change over time.

SUMMARY OF THE DISCLOSURE

In one embodiment, the present disclosure teaches a method and apparatus for forecasting busy hour traffic for a network. For example, the method obtains actual traffic data for a seed time frame for each of one or more sectors in a given market and marketing projections for one or more forecast time frames for the given market, and determines a market traffic actual measure for the given market from the actual traffic data. The method obtains for the given market, market traffic estimates from one or more previous runs for the seed time frame, and market traffic estimates from the one or more previous runs for one or more forecast time frames beyond the seed time frame, and updates the one or more market traffic estimates for the one or more forecast time frames beyond the seed time frame to obtain one or more updated market traffic estimates, wherein the updated market traffic estimates are used for forecasting the busy hour traffic data for each of the one or more forecast time frames beyond the seed time frame for each of the one or more sectors in the given market.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly teaches a method and apparatus for forecasting busy hour traffic for a network, e.g., a wireless network. Although the teachings of the present disclosure are discussed below in the context of a wireless network, the teaching is not so limited. Namely, the teachings of the present disclosure can be applied for other types of networks, wherein correlating historical busy hour traffic data (actual observed data) against historical marketing projections is beneficial for increasing the accuracy of a forecast of busy hour traffic data.

One method to ensure that the capacity of a network is adequate is to engineer the network based on busy hour traffic data. Busy hour traffic data may be based on historical usage data in conjunction with market level forecasts. For example, market level (e.g., a geographical area or region, i.e., part of a town, a town, a township, a county, a city and the like) forecasts may be projected periodically, e.g., monthly, quarterly, etc. However, successive forecasts of busy hour traffic based on periodic market level data may be inconsistent, thereby complicating the planning of a scaling up or a scaling down of the network capacity. For example, a forecast performed for a particular month two years prior to the particular month, may be too low if a particular application of interest to users was not anticipated. Another forecast performed two months later may predict an exponential growth of traffic. Yet, another forecast a few months later may show a linear growth. One example is a release of a device like an iPhone that tends to drive data traffic to unpredictable levels over a relatively short period of time. The forecast prior to the new device release may be too low and the forecast after the release may be too high. The inconsistency over various successive runs of forecasts reduces the robustness of the forecast of the busy hour traffic.

Furthermore, if the forecast increases and decreases in an unpredictable manner over time, the usefulness of the forecast information for equipment procurement and network planning is reduced. In addition, since the commitment of a capital budget requires a significant amount of time, if the forecast is not robust and accurate, the committing and de-committing of the capital budget makes network planning more difficult. The present disclosure discloses a method that provides a robust forecast of busy hour traffic for a network, e.g., a wireless network.

Figure 1:
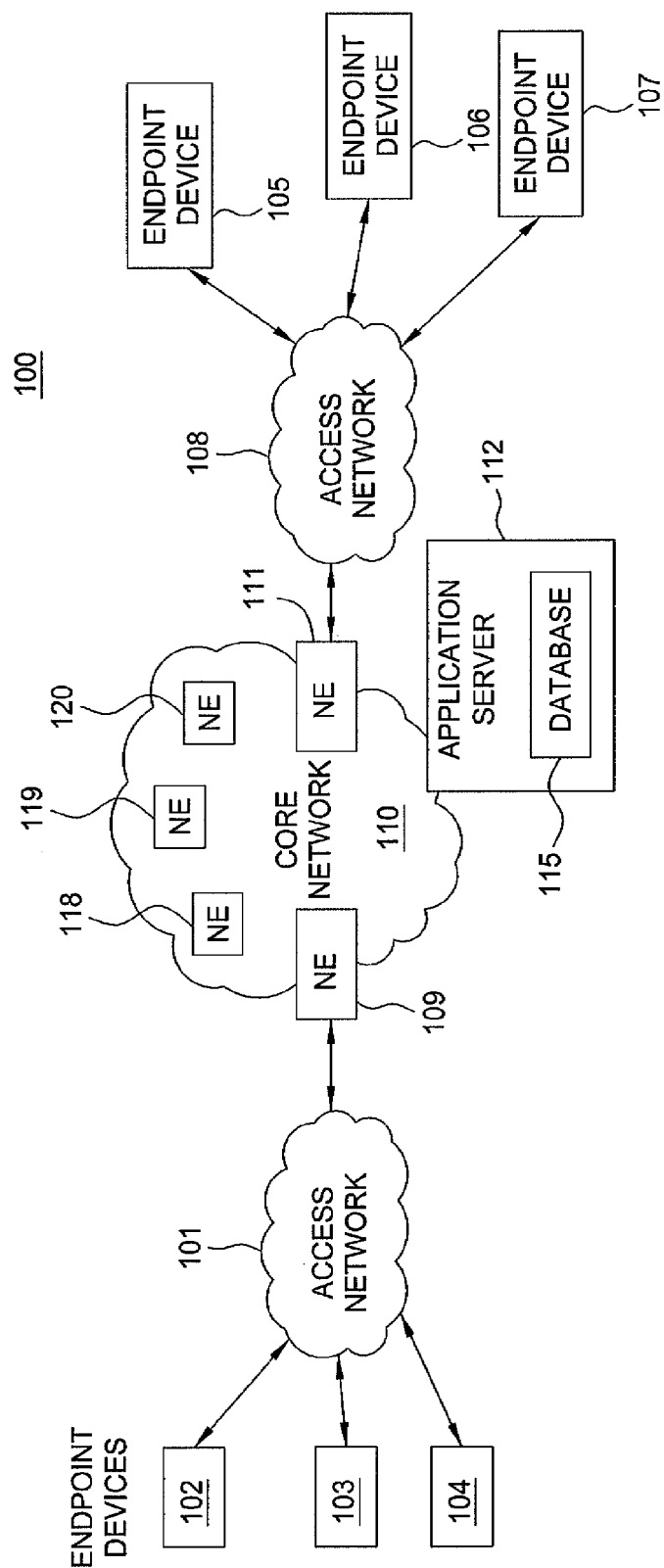
FIG. 1 illustrates an illustrative network related to the present disclosure.

FIG. 1 is a block diagram depicting an illustrative network 100 related to the current disclosure. Illustrative networks may include Internet protocol (IP) networks, Ethernet networks, wireless networks, cellular networks, and the like.

In one embodiment, the network may comprise a plurality of endpoint devices 102-104 configured for communication with the core network 110 (e.g., an IP based core backbone network supported by a service provider) via an access network 101. Similarly, a plurality of endpoint devices 105-107 are configured for communication with the core network 110 via an access network 108. The network elements (NEs) 109 and 111 may serve as gateway servers or edge routers for the network 110.

The endpoint devices 102-107 may comprise customer endpoint devices such as personal computers, laptop computers, Personal Digital Assistants (PDAs), servers, routers, wireless phones, smart phones, and the like. The access networks 101 and 108 serve as a means to establish a connection between the endpoint devices 102-107 and the NEs 109 and 111 of the core network 110. The access networks 101 and 108 may each comprise a Digital Subscriber Line (DSL) network, a broadband cable access network, a Local Area Network (LAN), a Wireless Access Network (WAN), a Radio Access Network (RAN), a $3^{rd}$ party network, and the like. The access networks 101 and 108 may be either directly connected to NEs 109 and 111 of the core network 110, or indirectly through another network.

Some NEs (e.g., NEs 109 and 111) reside at the edge of the core infrastructure and interface with customer endpoints over various types of access networks. An NE that resides at the edge of a core infrastructure can be implemented as an edge router, a media gateway, a border element, a firewall, a switch, and the like. An NE may also reside within the network (e.g., NEs 118-120) and may be used as a mail server, a router, or like device. The core network 110 also comprises an application server 112 that contains a database 115. The application server 112 may comprise any server or computer that is well known in the art, and the database 115 may be any type of electronic collection of data that is also well known in the art. It should be noted that although only six endpoint devices, two access networks, five network elements and so on are depicted in FIG. 1, the communication network 100 may be expanded by including additional endpoint devices, access networks, network elements, and/or application servers, without altering the teachings of the present disclosure. The above network 100 is described to provide an illustrative environment in which data for various services, e.g., voice and data services, are transmitted on networks.

In one embodiment, a service provider may enable customers to access services via a wireless access network. For example, a customer may use a cell phone to access Internet Protocol (IP) services, multimedia services, and the like. The packets from and to the wireless device, e.g., a cell phone, may then traverse one or more radio access networks and equipment, e.g., base stations and the like.

In one embodiment, a base station for a wireless network may be deployed with one or more directional antennas that cover a predetermined portion of the 360 degree angle. The coverage of one directional antenna is determined by dividing the 360 degrees by the number of directional antennas included in the base station. A portion of a wireless network that is covered with one directional antenna is referred to as a sector. For example, if there are three directional antennas at a base station, each directional antenna covers 120 degrees, thereby resulting in three sectors. The base station may also be referred to as a three sector base station.

Each sector uses a predetermined portion of available frequency resources such that adjacent sectors may assign channels in mutually exclusive frequency ranges. However, it should be noted that other cellular networks may assign frequency ranges in a different manner and the present disclosure is not limited in this aspect. For example, each of the three sectors discussed above may use one third of the available frequency resources. Adjacent sectors may use different frequency ranges. The channels for adjacent sectors are then assigned in mutually exclusive frequency ranges such that interference is minimized.

In one embodiment, the service provider may size the capacity of the radio access network and equipment, e.g., base stations and/or antennas, to be implemented in the radio access network based on a demand forecast. The demand forecast may be derived from marketing projections. For example, a marketing group may be responsible for making marketing projections based on advertising expenditures, the economical conditions for a geographical area, etc.

However, the marketing projections tend to be provided at a high level. In addition, usage of wireless services is dynamic. Typical users of wireless services are mobile and more likely to subscribe to new applications. For example, a new release of a product like an iPhone, iPOD, iPAD, etc, is followed by a significant increase in demand for capacity. The applications available on wireless end devices may then influence the extent to which various wireless services will be accessed. Due to the dynamic nature of the usage of the wireless services, it is difficult to provide an accurate marketing projection. Regardless of the difficulty in providing an accurate marketing projection, the service provider needs to provide adequate network capacity.

One method to engineer the network is based on busy hour traffic data. Busy hour traffic data may be based on historical usage data in conjunction with marketing projections. As discussed above, the marketing projections may be made periodically, e.g., monthly, quarterly, semi-annually, etc. The demand forecast for capacity may then be projected from the marketing projections using a network planning tool. For example, if an increase in subscriber base of 5% is projected, the network planning tool may use that information along with historical data to determine how much capacity needs to be in place to meet the demand. If the demand forecast indicates an increase and the historical data indicates a busy hour traffic data in relation to a demand level, the information may be used in network planning.

For example, if a base station needs to be deployed for every thousand subscribers in a geographical area and the projection indicates an increase from 10,000 subscribers to 12,000 subscribers, then the service provider may deduce a need for implementing two additional base-stations. It should be noted that this is only an illustrative example. However, as discussed above, successive forecasts of busy hour traffic based on periodic marketing projections may be inconsistent.

In one embodiment, the present disclosure teaches a method for forecasting busy hour traffic for a network, e.g., a wireless network, wherein the forecasted busy hour traffic is relatively consistent over successive runs. The current method provides a number of advantages. First, the method enables planning, such that equipment procurement and deployment of network resources may occur in a timely manner to meet the evolving business needs driven by customer demand and interest. Second, the method utilizes the capital investment (budget) in an efficient manner to allow resources to be provided when and where they are needed. Third, the method results in a smooth change in a requirement of a network resource (a smooth growth or a smooth decline in the requirement for a network resource) so that the network planning objectives are met in a robust manner. The smooth change refers to the consistency in trends from one forecast run to the next forecast run. In other words, the smooth change (evolution) reduces oscillations in forecast of busy hour traffic. The oscillations have detrimental effect on network planning by virtue of the fact that they lead to erratic and contradictory requirements that cause frequent deployment and decommissioning of equipment over short periods of time.

In order to more clearly illustrate the teachings of the current disclosure, the following terminologies and traffic modeling concepts will first be described:

Traffic model;
Seed month;
Market Traffic Actual (MTA); and
Market Traffic Estimate (MTE).

In one embodiment, a traffic model refers to a mathematical model or formula that can be used to characterize a traffic pattern. For example, a traffic model may relate an arrival rate for a specific type of packet traffic and the number of servers available to handle the arriving packets for the specific type of traffic to a blocking rate (blocking probability) for the specific type of traffic. For example, if the traffic type is voice, the model may relate the arrival rate of voice traffic and the number of resources handling voice traffic, to a blocking rate of voice calls in the network. In one embodiment, the current method may use different traffic models for voice packets, data packets, streaming media packets, and the like. For example, Erlangs may be used for voice traffic modeling.

In one embodiment, a seed month refers to the beginning month of a forecasting cycle for which actual figures are available from historical data.

In one embodiment, Market Traffic Actual (MTA) refers to a measure of a busy hour traffic from historical data summed across all sectors in a given market during a seed time frame, e.g., a seed month, a seed quarter, and so on.

In one embodiment, Market Traffic Estimate (MTE) refers to a measure of a busy hour traffic estimate summed across all sectors of a given market during a forecast time frame, e.g., a forecast month, a forecast quarter, and so on.

In one embodiment, the current method takes into account the correlation of actual busy hour traffic data (data for a time frame that is observed) to historical marketing projections, as further described below.

Figure 2:
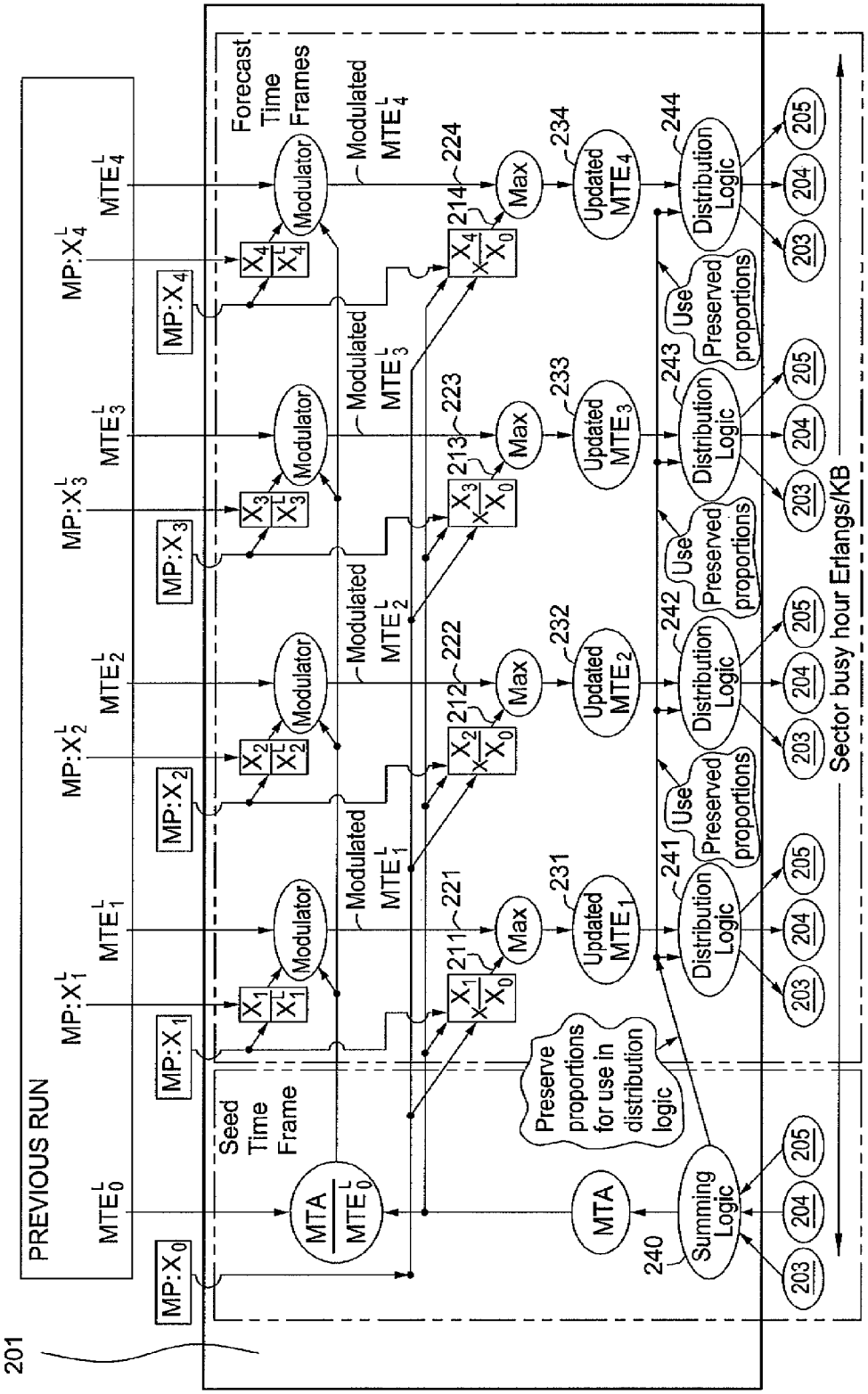
FIG. 2 illustrates a functional diagram of a demand forecasting engine.

FIG. 2 illustrates a functional diagram of a demand forecasting engine 200. The demand forecasting engine 200 may be implemented in an application server 201 that is tasked with outputting demand forecast data such that the output is provided to one or more systems that are responsible for network planning, capital planning, procurement, and so on. For example, the demand forecasting engine in application server 201 may be responsible for outputting busy hour traffic estimates for each sector in each base station in a radio access network. The radio access network may be an access network 101 or 108 as illustrated in FIG. 1 and the application server 201 may be a server located in the core network 110. For example, for the three sectors 203-205, the application server 201 may output busy hour traffic estimates. The network planning system may take the information to determine a number of directional antennas, channels, base stations, etc. that are needed. Similarly, the capital planning (budgeting) system and equipment procurement systems may use the information to determine how much equipment and/or budget is needed to meet the demand.

In one embodiment, for all sectors in a given market, the demand forecasting engine in application server 201 receives the actual traffic data for the seed time frame and the marketing projections for forecast time frames $X_i$, wherein i=0, ... N. N represents a number of forecast time frames (e.g., months, quarters, etc.). For example, if a forecast is to be done for 36 time frames based on a seed time frame, then N is 36. The seed time frame's marketing projection is represented by $X_0$. It should be noted that marketing projections X in the present context are not derived from actual traffic data, e.g., marketing projection data can be generated by a marketing department, e.g., for an entire market potentially covering thousands of sectors. For the example in FIG. 2, the application server 201 receives the actual traffic data for the sectors 203-205. The application server 201 then determines the Market Traffic Actual (MTA) by summing the received actual traffic data (e.g., from actual traffic counters) across all sectors in a given market during a seed time frame via the summing logic 240.

Furthermore, the forecasting engine receives marketing projections and Market Traffic Estimates (MTEs) from one or more previous runs. The current forecasting engine may use data from any number of previous runs. The marketing projections from the run immediately before the current run are represented by $X_i^L$, wherein i=0, ..., N. (i=0, ... N represents the same set of time frames referenced above). The marketing projections from the run prior to the run immediately before the current run are represented by $X_i^{LL}$, wherein i=0, ..., N. (i=0, ... N represents the same set of time frames referenced above) and so on.

The MTEs from the run immediately before the current run, for the time frames which are forecasted time frames in the current run, are represented by $MTE_i^L$, wherein i=1, ..., N. (i=1, ... N represents the same set of time frames referenced above). The MTEs from the run prior to the run immediately before the current run, for the time frames which are forecasted time frames in the current run, are represented by $MTE_i^{LL}$, wherein i=1, ..., N and so on. Similarly, the MTEs from the one or more previous runs for the time frame which is now a seed time frame are represented by $MTE_0^L$, $MTE_0^{LL}$, $MTE_0^{LLL}$, etc.

For the example above, there are four forecast time frames. $MTE_1^L$, $MTE_2^L$, $MTE_3^L$, and $MTE_4^L$ represent the market traffic estimates for the same four time frames from the previous run. $MTE_0^L$ represents the market traffic estimate from the previous run for the time frame which is now the seed time frame.

In one embodiment, the method provides an updated estimate for busy hour traffic using an algorithm that has one or more components. For example, the one or more components comprise at least one of: a first component derived by scaling from the actual busy hour traffic data (from a time frame that is already observed); and a second component derived by inferring from previous marketing projections and estimates of busy hour traffic (MTEs forecasted in previous runs). The first components for the four time frames are shown as 211-214 and the second components are shown as 221-224.

In one embodiment, the current method curtails significant departures from actual data by associating a higher weight to the first component (which is derived from actual busy hour data) as compared to the weight given to the second component (which is derived by inferring from previous estimates of busy hour data and marketing projections). The motivation for assigning different significances for the two components is the need to reduce the effect of a marketing projection that may contain an error.

In one embodiment, the first component is derived by scaling the MTA in accordance with a ratio of the marketing projection for the forecast time frame in question to the marketing projection for the seed time frame. For example, for a specific time frame i, the first component is equal to (MTA× $X_i/X_0$).

In one embodiment, the second component, referred to as the modulated MTE, is derived by applying an operator that either slows down or speeds up a scaling from a previous run. The operator is also referred to as a modulation operation, or simply as a modulator. For a specific time frame (e.g., a specific month, quarter year, year, etc.), if the marketing projection for the current run is greater than or equal to the corresponding marketing projection from a previous run, the modulator slows down the scaling up from the previous run. Similarly, if the marketing projection for the current run is less than the corresponding marketing projection from the previous run, the modulator speeds up the scaling down from the previous run.

In one embodiment, the modulation operator is defined as: Modulated $MTE_i^L = f(MTE_i^L, \beta, \alpha_i)$, wherein the input ($MTE_i^L$) represents the MTE for the same time frame from the run immediately prior to the current run, $$\beta = \frac{MTA}{MTB_0^L}, \text{ and } \alpha_i = \frac{x_i}{x_i^I}.$$

The function $f(MTE_i^L, \beta, \alpha_i)$ has a value obtained by performing the following:
(1) Set $\beta$=Minimum ($\beta$, 1);
(2) If ($\alpha_i \geq 1$) then Modulated $MTE_i^L = \{(\alpha_i-1)\beta+1\} \times MTE_i^L$;
Else Modulated $MTE_i^L = \{\alpha_i \beta\} \times MTE_i^L$.

In one embodiment, in the above modulation operator, $\beta$ is used to control the extent of the slowing down or speeding up of the modulated MTE component fed to the maximization logic that generates the updated MTE. Note that $\beta$ is determined as the ratio of the actual busy hour data for the seed time period of the current run that has already been observed and the corresponding estimate from the previous run. Hence, $\beta$ serves as a factor that is based on a measurement of the overall consistency between the marketing projections and the actual historical data. If previous marketing projections have accurately predicted the actual busy hour data, $\beta$ becomes close to one and the modulator gives the marketing projections heavier weight by facilitating full natural scaling in the generation of the modulated MTE. If previous marketing projections have been inaccurate, the modulator gives little weight to the marketing projections by attenuating the modulated MTE, thereby encouraging the maximization operator to favor the projections that are scaled from actual observations. The extent of the slowing down or speeding up may then be determined by first determining how well previous marketing projections have performed in estimating the busy hour traffic data for a time period that has already been observed, i.e., by finding $\beta$ from the seed time period of the current run.

In one embodiment, in the above modulation operator, $\alpha_i$ is used to determine the extent of the slowing down or speeding up. Note that, in the above relationship, setting $\beta=1$, makes the relationship purely dependent only on $\alpha_i$. Specifically, if $\beta=1$, the Modulated $MTE_i^L = \alpha_i \times MTE_i^L$. The extent of the slowing down or speeding up is then determined by $\alpha_i$, which is the ratio of the current marketing projection for a specific time frame to the previous marketing projection for the same specific time frame from the previous run. For example, if the marketing projection doubled between the previous run and the current run, the Modulated $MTE_i^L$ becomes twice the $MTE_i^L$.

In one embodiment, in the above modulation operator, $\beta$ and $\alpha_i$ are both used to determine the extent of the slowing down or speeding up. For example, if $0<\beta<1$, then the Modulated $MTE_i^L = \alpha_i \times MTE_i^L$ depends on both $\beta$ and $\alpha_i$.

Once the Modulated $MTE_i^L$ is found, the method determines the MTE for the current run from the first and second components, described above. In one embodiment, the MTE for the current run ($MTE_i$) is determined as the maximum of the one or more components. For example, the MTE for the current run is the maximum of the first component and the second component. The MTEs for the current run for the four time frames are shown as 231-234. The maximum of the estimates is selected because underestimating the demand for capacity may affect customers. For example, the blocking probability may increase, resulting in customer dissatisfaction with the service. As such, the network operator may prefer reducing the chance of underestimating the demand.

In one embodiment, the method distributes the MTE for the current run among all the sectors in a given market in accordance with the same relative proportions used to derive the MTA. For example, if a given market has 10 sectors, and a particular sector x contributed to 5% of the MTA during the seed month when the MTA was derived by summing all the busy hour traffic data across the 10 sectors, then the particular sector x is apportioned 5% of the value of the MTE for the current run. In order to distribute the MTE in accordance with the same relative proportions used to obtain the MTA, for each sector contributing towards the MTA, the method preserves the proportions. For the sectors above 203-205, the distribution logics 241-244 are used to distribute the MTEs 231-234 in accordance with the preserved proportions.

In one embodiment, the resulting MTE and/or the forecasts for each sector are provided by the forecasting engine to one or more systems, such as network planning systems, capital planning systems, equipment procurement systems, etc.

Note that although the above example illustrates a forecasting engine outputting demand forecast to one or more systems, the service provider may implement the forecasting engine and the various network planning, capital planning, equipment procurement planning, etc. functions in any number of application servers. Thus, the above example is not intended to limit the implementation of the present disclosure.

Although the description above provided the current MTE with one previous run, any number of previous runs may be included. For example, the marketing projection may need to be consistent not only from one run to the next run, but also across a plurality of runs. The second component, described above, may then be derived by applying the modulator that either slows down or speeds up a scaling from any previous run.

For illustrative example, if marketing projections from three previous runs are used, then:

$$(MTE_i) = \text{Maximum} \begin{cases} MTA \times \frac{x_i}{x_0}, \\ \text{Modulated } MTE_i^L, \\ \text{Modulated } MTE_i^{LL}, \\ \text{and Modulated } MTE_i^{LLL} \end{cases};$$

wherein each of the Modulated $MTE_i^L$, Modulated $MTE_i^{LL}$, and Modulated $MTE_i^{LLL}$ are derived using their respective values of $\beta$ and $\alpha_i$.

Figure 3:
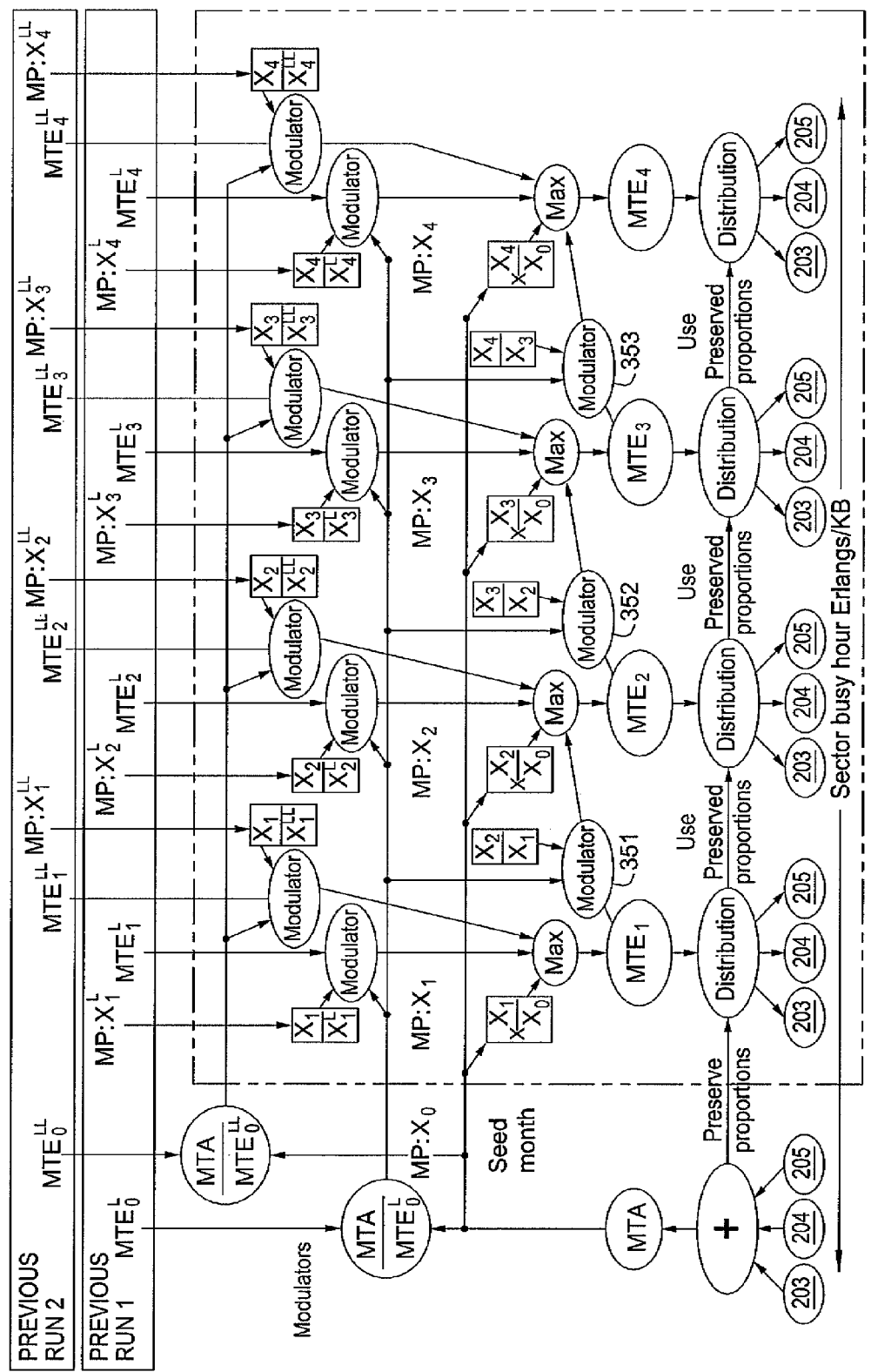
FIG. 3 illustrates a demand forecasting engine that uses the two most recent marketing forecast runs.

FIG. 3 illustrates a demand forecasting engine 300 that uses the two most recent marketing forecast runs. That is, there are two marketing projections from previous runs that may be used along with the marketing projection from the current (seed) time frame. It should be noted that FIG. 3 is simplified when compared to FIG. 2 in order to improve clarity to the reader given that additional inputs are added into FIG. 3. FIG. 3 is similar to FIG. 2 except for the fact that the above maximum function has input from three types of sources: from the seed month (first component); from the two previous runs (two second components); and from the current run's demand forecast for the forecast time frame that is immediately preceding the current time frame. For the example in FIG. 3, the inputs for the current run's demand forecasts from the forecast time frame immediately preceding the current forecast time frame are shown being provided via the modulators 351, 352 and 353. For example, the modulator 351 provides an input for the second forecasting time frame based on the updated MTE of the first forecasting time frame. Note that the MTE of the first forecasting time frame is the MTE derived in the current run. Then, once MTE for the second time frame is derived, the modulator 352 is used to provide an input for the third time frame. The above method of using the modulators 351-353 to provide input for forecasting of the MTE of the next time frame may be conceptualized as a feed forward algorithm.

Figure 4:
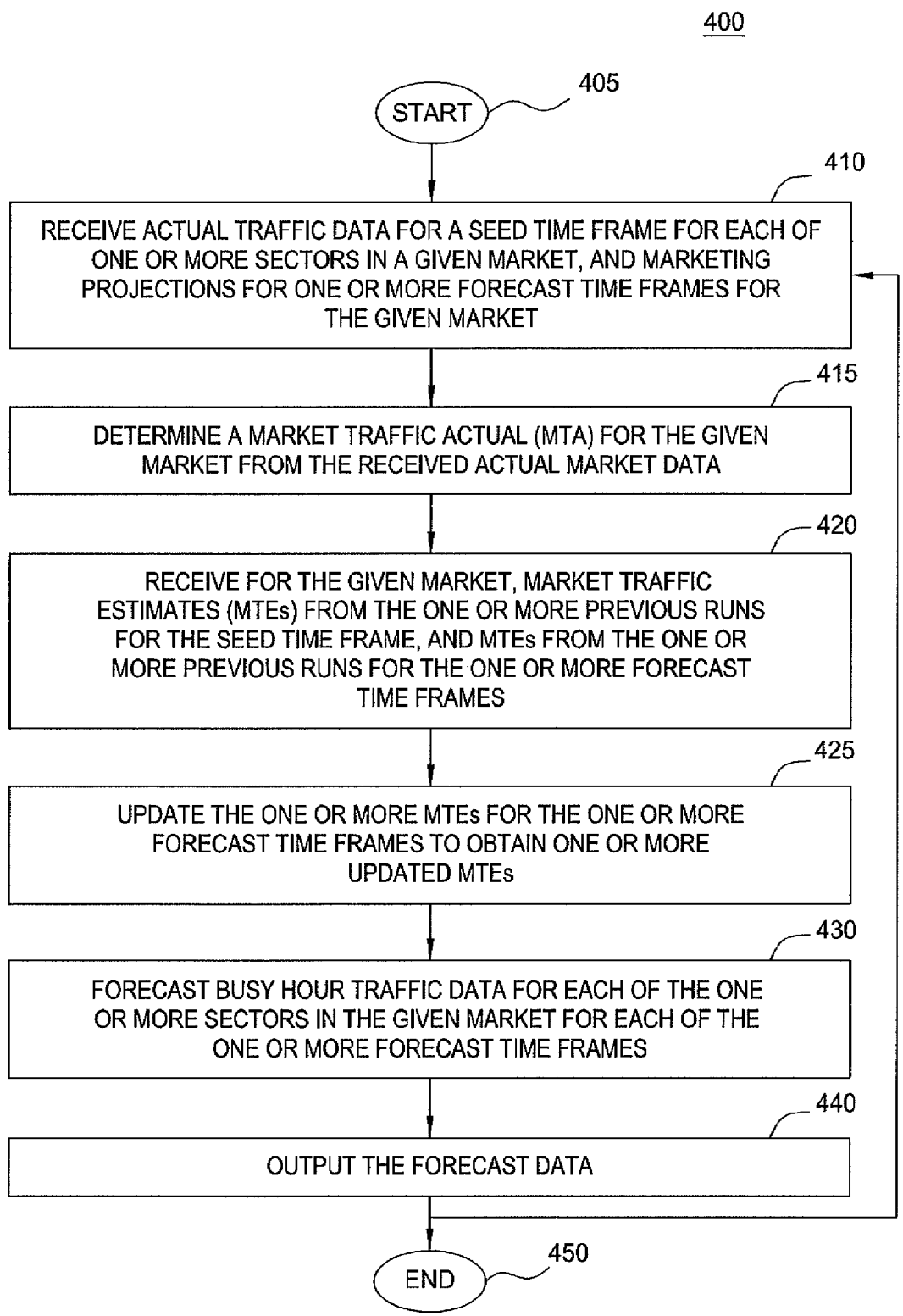
FIG. 4 illustrates a flowchart of a method for forecasting busy hour traffic for a network.

FIG. 4 illustrates a flowchart of a method 400 for forecasting busy hour traffic for a network, e.g., a wireless network. Method 400 starts in step 405 and proceeds to step 410.

In step 410, method 400 receives or obtains actual traffic data for a seed time frame for each of one or more sectors (e.g., via traffic counters) in a given market, and marketing projections for the seed month as well as one or more forecast time frames in the given market (from one or more runs, e.g., $X_i^L$, $X_i^{LL}$, and so on). For example, the method receives $X_0$ (marketing projection for the seed time frame) and $X_i$, wherein i=1, ... N, wherein N represents a number of forecast time frames.

In step 415, method 400 determines a Market Traffic Actual (MTA) for the given market from the actual traffic counters corresponding to the set of sectors comprising the market. For example, the method may determine the MTA for a specific market by summing the actual traffic counters for all sectors in the given market during the seed time frame.

In step 420, method 400 receives or obtains Market Traffic Estimates (MTEs) from the one or more previous runs for the seed time frame, and MTEs from the one or more previous runs for the one or more forecast time frames beyond the seed time frame. For example, if there is one previous run, the method receives $MTE_i^L$, wherein i=0, ..., N. If there are two previous runs, the method receives $MTE_i^L$, and $MTE_i^{LL}$, wherein i=0, ..., N.

In step 425, method 400 updates the one or more MTEs for the one or more forecast time frames to obtain one or more updated MTEs, wherein each of the one or more updated MTEs is determined using an algorithm that has one or more components, wherein the one or more components comprise at least one of: a first component derived by scaling from the MTA for the given market; and a second component derived from at least one of the marketing projection for the forecast time frame from the one or more previous runs, the MTEs from the one or more previous runs for the forecast time frame, and the MTEs from the one or more previous runs for the seed time frame. For example, if i=1 and there is one previous run, the second component may be derived from at least one of: $X_1^L$, $MTE_0^L$, and $MTE_1^L$. Similarly, if i=1 and there are two previous runs, the second component may be derived from at least one of: $X_1^L$, $MTE_0^L$, $MTE_1^L$, $X_1^{LL}$, $MTE_0^{LL}$, and $MTE_1^{LL}$;

In one embodiment, each of the one or more updated MTEs for the one or more forecast time frames is determined as a maximum of the first component and the second component.

In step 430, method 400 forecasts busy hour traffic data for each of the one or more sectors in the given market for each of the one or more forecast time frames, wherein the forecasting is performed by distributing the updated MTE for the forecast time frame among all sectors in the given market in accordance with the same relative proportions used to derive the MTA for the given market.

In step 440, method 400 outputs the forecast data. For example, systems that are responsible for network deployment, capital planning, etc. may use the forecasted busy hour traffic data for their respective tasks. Note that the updated MTEs are stored for use in future runs. For example, for the next run, the updated MTEs from the current run serve as results of a previous run. The method then ends in step 450 or returns to step 410 to continue.

It should be noted that although not explicitly specified, one or more steps of method 400 may include a storing, displaying and/or outputting step as required for a particular application. In other words, any data, records, fields, and/or intermediate results discussed in the method 400 can be stored, displayed and/or outputted to another device as required for a particular application.

Figure 5:
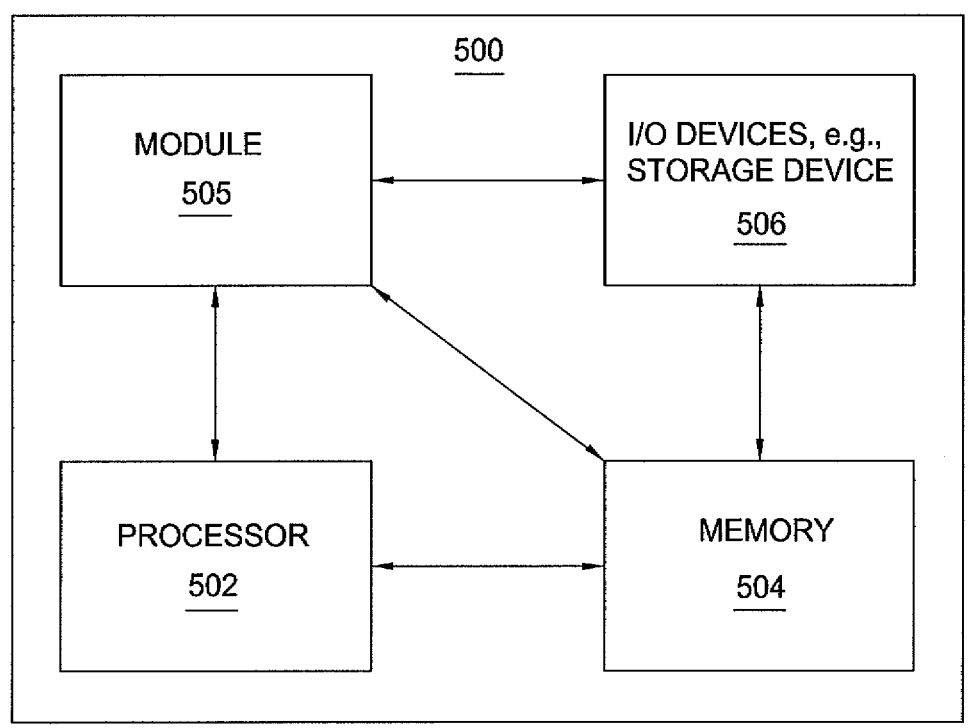
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for forecasting busy hour traffic for a network, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the teachings of the present disclosure can be implemented in software and hardware, e.g., using application specific integrated circuits (ASIC), a general purpose computer or any other hardware equivalents. In one embodiment, the present module or process 505 for forecasting busy hour traffic for a network can be loaded into memory 504 and executed by processor 502 to implement the functions as discussed above. As such, the present method 505 for forecasting busy hour traffic for a network (including associated data structures) of the present disclosure can be stored on a non-transitory computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for forecasting busy hour traffic for a network, comprising:

obtaining, by a processor, actual traffic data for a seed time frame for each of a plurality of sectors in a given market and marketing projections for a plurality of forecast time frames beyond the seed time frame for the given market, wherein the actual traffic data for the seed time frame comprises historical busy hour traffic data and wherein the marketing projections for the plurality of forecast time frames beyond the seed time frame comprise marketing projections for busy hour traffic data for the plurality of forecast time frames;

determining, by the processor, a market traffic actual measure for the seed time frame and for the given market from the actual traffic data for the seed time frame, wherein the market traffic actual measure is determined for the given market by summing the actual traffic data for the seed time frame across all sectors in the given market during the seed time frame;

obtaining, by the processor, for the given market, a first set of market traffic estimates from a plurality of previous runs for the seed time frame, and a second set of market traffic estimates from the previous runs for the forecast time frames beyond the seed time frame; and updating, by the processor, the second set of market traffic estimates for the forecast time frames beyond the seed time frame to obtain updated market traffic estimates, wherein the updated market traffic estimates are used for forecasting the busy hour traffic data for each of the forecast time frames beyond the seed time frame for each of the sectors in the given market, wherein each of the updated market traffic estimates is determined using a first component and a second component, wherein the first component is derived by scaling the market traffic actual measure for the given market, wherein the scaling the market traffic actual measure for the given market is performed in accordance with a ratio of a marketing projection for one of the forecast time frames beyond the seed time frame to a marketing projection for the seed time frame, and wherein the second component is derived from the first set of market traffic estimates from the previous runs for the seed time frame, wherein the second component is based upon a ratio of the market traffic actual measure for the seed time frame to a market traffic estimate from the first set of market traffic estimates from the plurality of previous runs for the seed time frame;

wherein the second component is derived by applying a modulator, wherein the modulator is an operator that either slows down or speeds up a scaling from one of the previous runs; wherein the modulator is a function defined as:

Modulated $MTE_i^L = f(MTE_i^L, \beta, \alpha_i)$, wherein a value of the function is obtained by performing:

Set $\beta = \text{Minimum}(\beta, 1)$, (1)

If $(\alpha_i \geq 1)$ then Modulated $MTE_i^L = \{(\alpha_i - 1)\beta + 1\} \times MTE_i^L$, (2)

Else Modulated $MTE_i^L = \{\alpha_i \beta\} \times MTE_i^L$, wherein an input $MTE_i^L$ is the market traffic estimate for the same time frame from a previous run immediately prior to the current run, $\beta$ is determined as a ratio of the actual busy hour data for a time period that has already been observed and a corresponding estimate from the previous run, and $\alpha_i$ determined as a ratio of a current marketing projection for a specific time frame to the previous marketing projection for the same specific time frame from the previous run.

2. The method of claim 1, wherein the forecasting busy hour traffic data for a forecast time frame beyond the seed time frame is performed by distributing the updated market traffic estimates of the forecast time frame among all sectors in the given market in accordance with the same relative proportions used to derive the market traffic actual measure for the given market.

3. The method of claim 1, wherein each of the updated market traffic estimates for each of the forecast time frames is determined as a maximum of the first component and the second component.

4. A non-transitory computer-readable storage medium storing instructions which, when executed by a processor, cause the processor to perform operations for forecasting busy hour traffic for a network, the operations comprising:

obtaining actual traffic data for a seed time frame for each of a plurality of sectors in a given market and marketing projections for a plurality of forecast time frames beyond the seed time frame for the given market, wherein the actual traffic data for the seed time frame comprises historical busy hour traffic data and wherein the marketing projections for the plurality of forecast time frames beyond the seed time frame comprise marketing projections for busy hour traffic data for the plurality of forecast time frames;

determining a market traffic actual measure for the seed time frame and for the given market from the actual traffic data for the seed time frame, wherein the market traffic actual measure is determined for the given market by summing the actual traffic data for the seed time frame across all sectors in the given market during the seed time frame;

obtaining for the given market, a first set of market traffic estimates from a plurality of previous runs for the seed time frame, and a second set of market traffic estimates from the previous runs for the forecast time frames beyond the seed time frame; and updating the second set of market traffic estimates for the forecast time frames beyond the seed time frame to obtain updated market traffic estimates, wherein the updated market traffic estimates are used for forecasting the busy hour traffic data for each of the forecast time frames beyond the seed time frame for each of the sectors in the given market, wherein each of the updated market traffic estimates is determined using a first component and a second component, wherein the first component is derived by scaling the market traffic actual measure for the given market, wherein the scaling the market traffic actual measure for the given market is performed in accordance with a ratio of a marketing projection for one of the forecast time frames beyond the seed time frame to a marketing projection for the seed time frame, and wherein the second component is derived from the first set of market traffic estimates from the previous runs for the seed time frame, wherein the second component is based upon a ratio of the market traffic actual measure for the seed time frame to a market traffic estimate from the first set of market traffic estimates from the plurality of previous runs for the seed time frame;

wherein the second component is derived by applying a modulator, wherein the modulator is an operator that either slows down or speeds up a scaling from one of the previous runs; wherein the modulator is a function defined as:

Modulated $MTE_i^L = f(MTE_i^L, \beta, \alpha_i)$, wherein a value of the function is obtained by performing:

Set $\beta = \text{Minimum}(\beta, 1)$, (1)

If $(\alpha_i \geq 1)$ then Modulated $MTE_i^L = \{(\alpha_i - 1)\beta + 1\} \times MTE_i^L$, Else Modulated $MTE_i^L = \{\alpha_i \beta\} \times MTE_i^L$, wherein an input $MTE_i^L$ is the market traffic estimate for the same time frame from a previous run immediately prior to the current run, $\beta$ is determined as a ratio of the actual busy hour data for a time period that has already been observed and a corresponding estimate from the previous run, and $\alpha_i$ determined as a ratio of a current marketing projection for a specific time frame to the previous marketing projection for the same specific time frame from the previous run.

5. The non-transitory computer-readable storage medium of claim 4, wherein the forecasting busy hour traffic data for a forecast time frame beyond the seed time frame is performed by distributing the updated market traffic estimates of the forecast time frame among all sectors in the given market in accordance with the same relative proportions used to derive the market traffic actual measure for the given market.

6. The non-transitory computer-readable storage medium of claim 4, wherein each of the updated market traffic estimates for each of the forecast time frames is determined as a maximum of the first component and the second component.

7. An apparatus for forecasting busy hour traffic for a network, comprising:
   a processor; and a computer-readable medium storing instructions which, when executed by the processor, cause the processor to perform operations, the operations comprising:
   obtaining actual traffic data for a seed time frame for each of a plurality of sectors in a given market and marketing projections for a plurality of forecast time frames beyond the seed time frame for the given market, wherein the actual traffic data for the seed time frame comprises historical busy hour traffic data and wherein the marketing projections for the plurality of forecast time frames beyond the seed time frame comprise marketing projections for busy hour traffic data for the plurality of forecast time frames;
   determining a market traffic actual measure for the seed time frame and for the given market from the actual traffic data for the seed time frame, wherein the market traffic actual measure is determined for the given market by summing the actual traffic data for the seed time frame across all sectors in the given market during the seed time frame;
   obtaining for the given market, a first set of market traffic estimates from a plurality of previous runs for the seed time frame, and a second set of market traffic estimates from the previous runs for the forecast time frames beyond the seed time frame; and
   updating the second set of market traffic estimates for the forecast time frames beyond the seed time frame to obtain updated market traffic estimates, wherein the updated market traffic estimates are used for forecasting the busy hour traffic data for each of the forecast time frames beyond the seed time frame for each of the sectors in the given market, wherein each of the updated market traffic estimates is determined using a first component and a second component, wherein the first component is derived by scaling the market traffic actual measure for the given market, wherein the scaling the market traffic actual measure for the given market is performed in accordance with a ratio of a marketing projection for one of the forecast time frames beyond the seed time frame to a marketing projection for the seed time frame, and wherein the second component is derived from the first set of market traffic estimates from the previous runs for the seed time frame, wherein the second component is based upon a ratio of the market traffic actual measure for the seed time frame to a market traffic estimate from the first set of market traffic estimates from the plurality of previous runs for the seed time frame;
   wherein the second component is derived by applying a modulator, wherein the modulator is an operator that either slows down or speeds up a scaling from one of the previous runs; wherein the modulator is a function defined as:

Modulated $MTE_i^L = f(MTE_i^L, \beta, \alpha_i)$, wherein a value of the function is obtained by performing:

Set $\beta = \text{Minimum}(\beta, 1)$, (1)

If $(\alpha_i \geq 1)$ then Modulated $MTE_i^L = \{(\alpha_i - 1)\beta + 1\} \times MTE_i^L$, (2)

Else Modulated $MTE_i^L = \{\alpha_i \beta\} \times MTE_i^L$, wherein an input $MTE_i^L$ is the market traffic estimate for the same time frame from a previous run immediately prior to the current run, $\beta$ is determined as a ratio of the actual busy hour data for a time period that has already been observed and a corresponding estimate from the previous run, and $\alpha_i$ determined as a ratio of a current marketing projection for a specific time frame to the previous marketing projection for the same specific time frame from the previous run.

8. The apparatus of claim 7, wherein the forecasting busy hour traffic data for a forecast time frame beyond the seed time frame is performed by distributing the updated market traffic estimates of the forecast time frame among all sectors in the given market in accordance with the same relative proportions used to derive the market traffic actual measure for the given market.

* * * * *